W. A. McCOOL.
TYPE WRITER.
APPLICATION FILED FEB. 25, 1905.

1,069,275.

Patented Aug. 5, 1913.
9 SHEETS—SHEET 3.

Fig. 3.

Witnesses
Edwin L. Bradford
Auguste J Lix

Inventor
William A. McCool
By H. H. Bliss
Attorney

W. A. McCOOL.
TYPE WRITER.
APPLICATION FILED FEB. 25, 1905.

1,069,275.

Patented Aug. 5, 1913.
9 SHEETS—SHEET 4.

Witnesses
Edwin L. Bradford.
Auguste J. Lif.

Inventor
William A. McCool
H. H. Bliss
Attorney

W. A. McCOOL.
TYPE WRITER.
APPLICATION FILED FEB. 25, 1905.

1,069,275.

Patented Aug. 5, 1913.
9 SHEETS—SHEET 7.

UNITED STATES PATENT OFFICE.

WILLIAM A. McCOOL, OF BEAVER FALLS, PENNSYLVANIA, ASSIGNOR, BY MESNE ASSIGNMENTS, TO JOHN G. LEWIS, OF ST. LOUIS, MISSOURI.

TYPE-WRITER.

1,069,275.      Specification of Letters Patent.      Patented Aug. 5, 1913.

Application filed February 25, 1905. Serial No. 247,393.

*To all whom it may concern:*

Be it known that I, WILLIAM A. McCOOL, a citizen of the United States, residing at Beaver Falls, in the county of Beaver and State of Pennsylvania, have invented certain new and useful Improvements in Type-Writers, of which the following is a specification, reference being had therein to the accompanying drawing.

Figure 2:
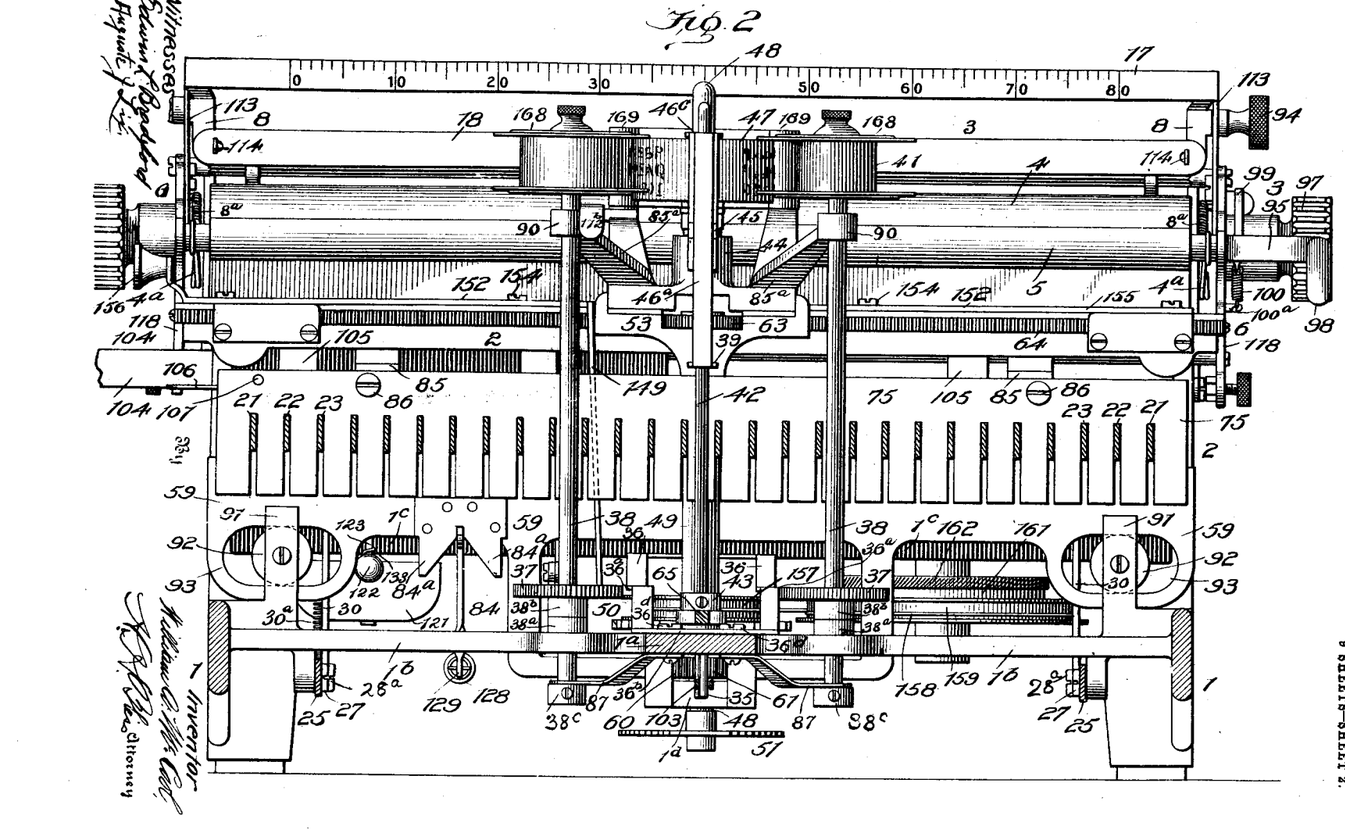
Fig. 2 is a transverse section on the line $x$—$x$ of Fig. 1.
Figure 3:
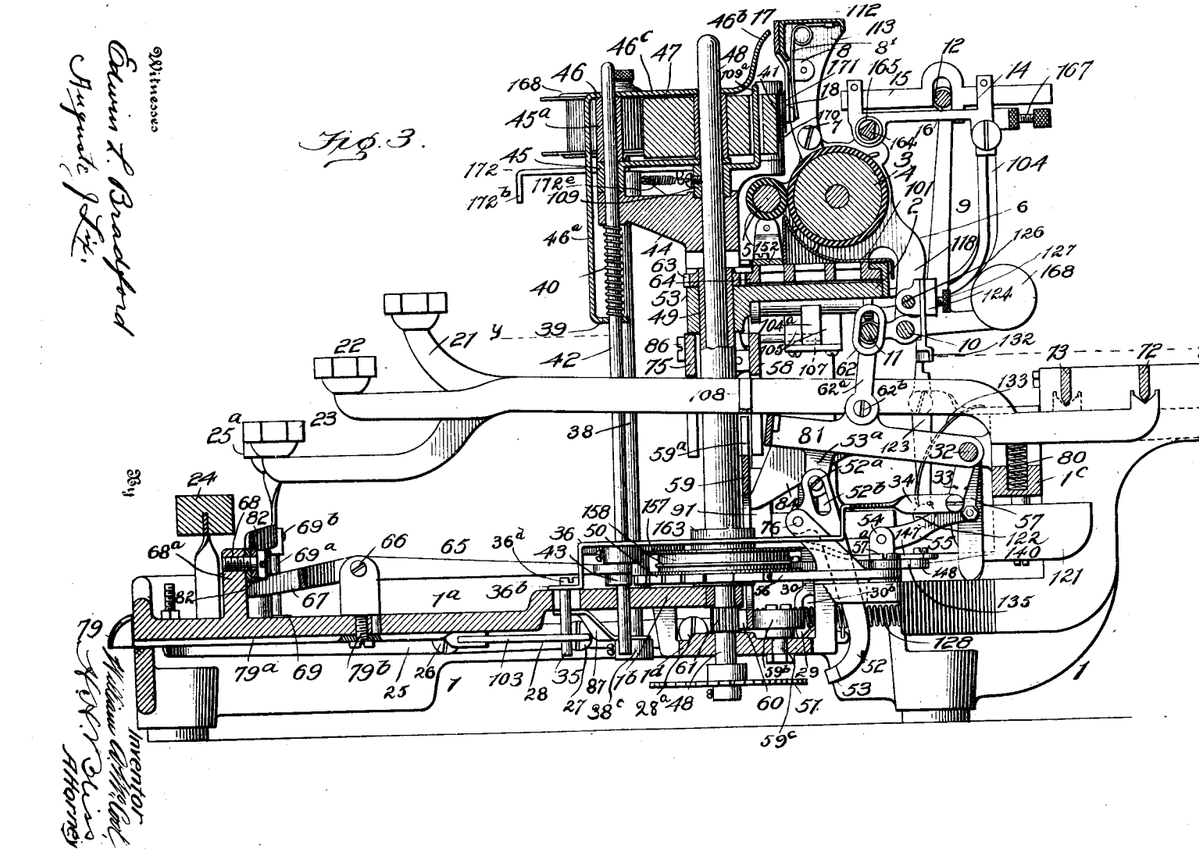
Fig. 3 is a central, vertical, longitudinal section.
Figure 4:
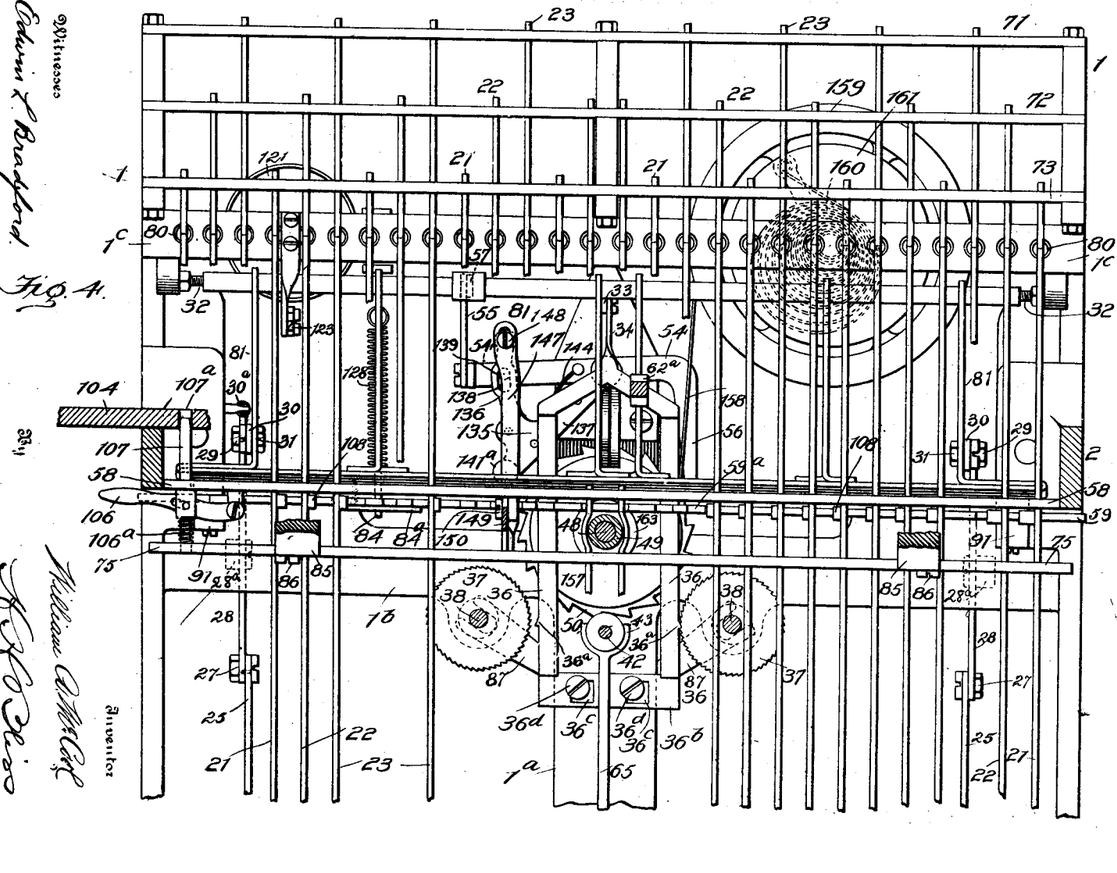
Fig. 4 is a horizontal section of the rear part of the machine on the line $y$—$y$ of Fig. 3.

1 is a frame made of any suitable material, and has either integral with it, or attached to it, and slightly below the upper surface a longitudinal brace $1^a$ and a transverse brace $1^b$ (Fig. 2). Higher than said braces, and at the rear of the frame, there is a transverse key lever seat $1^c$ (Figs. 3 and 4). About midway of its length a bridge 2 is mounted transversely of the frame, which is milled out or otherwise shaped to form ways for a carriage 3 which is guided, longitudinally, on the bridge 2, and transversely of the frame 1.

Figures 22, 23, 24, 25, 26, 27:
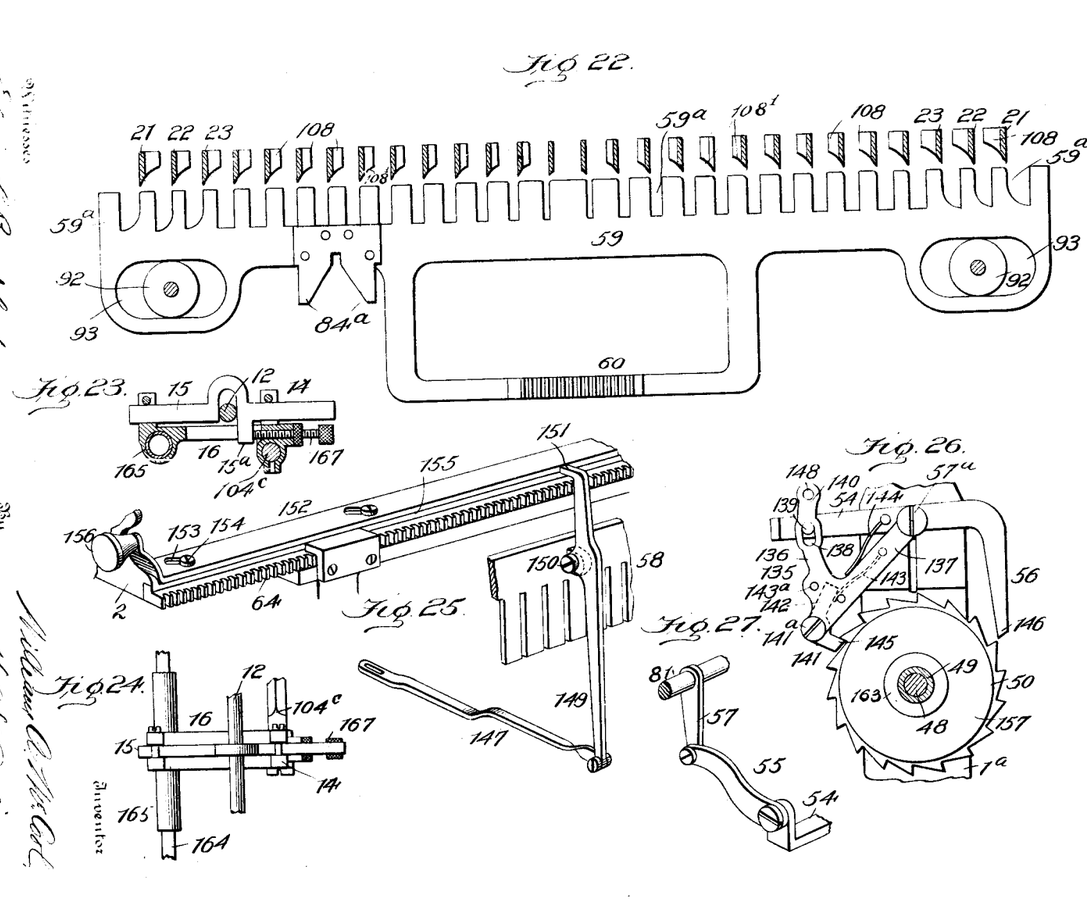
Fig. 22 is a front face view of the type wheel setting bar and showing in section the several key levers above it.
Fig. 23 is a side view of the hammer and showing in section its supporting parts.
Fig. 24 is a plan view of the parts in Fig. 23.
Fig. 25 is a perspective showing the device by which the escapement is thrown out of action and when the carriage is to be moved independently.
Fig. 26 is a plan of the escapement devices which permit and prevent the longitudinal movements of the carriage.
Fig. 27 is a perspective of the parts which connect the escapement to the actuating frame.

Vertically slotted guides 91 project upwardly from the transverse brace $1^b$ in front of the bridge 2, and a transversely movable type wheel-setting bar 59 is mounted therein, upon the rollers 92, 92 there being longitudinal slots 93 in the bar 59 for these rollers (Figs. 2 and 22). The rack bar is situated at approximately the longitudinal centers of the key levers 21, 22 and 23, which are mounted upon the key-seat $1^c$ in three banks (Figs. 3 and 4). The purpose of this construction is to have the distance from the setting bar 59 to the key fulcrum equal to the distance from the bar 59, to the center of the key or striking point of each of the keys. The fulcrum of the upper and shorter key levers 21, is shown at 73, that of the intermediate key levers 22 at 72, and that of the longer key levers 23 at 71.

Each key lever is provided with a spiral spring 80, fitted within a pocket in the key-lever-seat $1^c$, and supporting the key lever at a point between its fulcrum and the setting bar 59; and in this way, is obtained an equality of "touch" and of motion, for at the central working points, in the setting bar 59, the amount of depression is the same for all the keys, and as all are equi-levers, the total depression of all the keys and the energy required for such depression are the same in all.

Centrally fixed upon one side of each key lever is a cam block 108, the levers upon the right side of the longitudinal center of the machine respectively having their blocks upon the left and those on the left side of said central plane having their blocks on the right sides (Fig. 22). The blocks have inclined operative edges which vary in width in order that they may differentially move the setting bar 59, the latter having recesses 59$^a$ into which they enter when depressed. And, as it is essential that the type-wheel 47 (Figs. 1 and 3) which is rotated by the movement of the rack bar 59, shall be turned on its axis just sufficiently to bring the desired character on its periphery to central alinement with the paper on the carriage, each cam block 108 has its greatest horizontal diameter or width equal to the distance which it is required to move the setting bar 59 to bring such character to the proper position. And, as it is requisite in the cycle of movement, caused by each depression of a key, that the work effected by the first portion of the stroke shall be accomplished, and the members actuated by that portion of the stroke brought to rest, before certain other operations ensue, these blocks are concaved from the bottom of the key lever more or less, each to a point answering to two-thirds the fixed distance through which the key lever travels at its point of engagement with the setting bar 59. The outer edge of the block is parallel with the key lever from that point upward.

Figures 6, 7, 8:
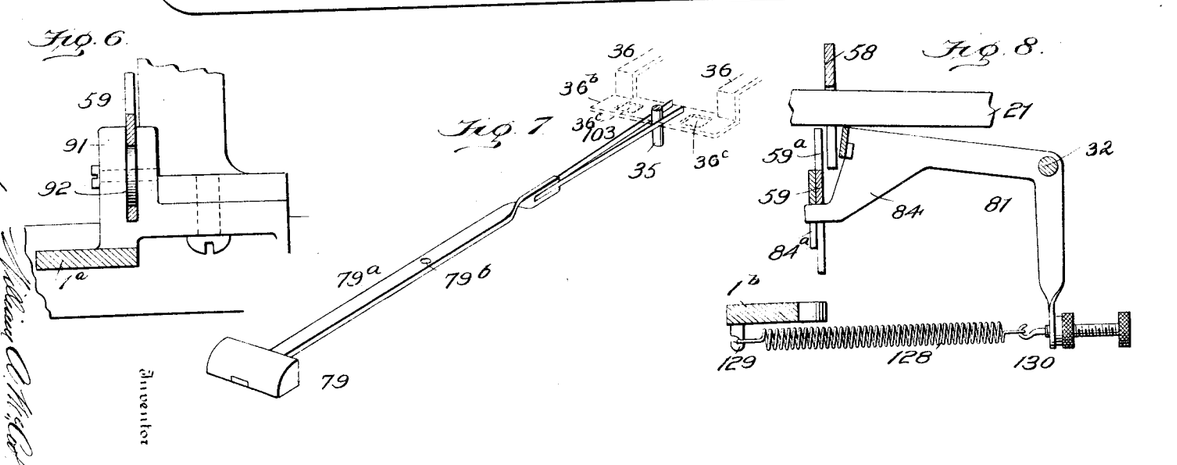
Fig. 6 is a section of the type setting bar and showing one of its supporting rollers.
Fig. 7 is a perspective of the lever by which is moved the pawl device that actuates the ribbon rolls.
Fig. 8 is a cross section of the vertical swinging frame and showing its returning spring.

The setting bar 59 rests normally in place on the rollers 92, 92, in vertical slots in the guides 91, 91, as above described, and is retained in its central position by the guide 84, which is attached to the rocking frame 81, and extends downwardly and forwardly and is seated in a recess at the upper ends of two oppositely inclined faces 84$^a$ in the lower edge of the bar 59, or in a plate secured thereto (Figs. 2, 8 and 22).

Figures 10, 11:
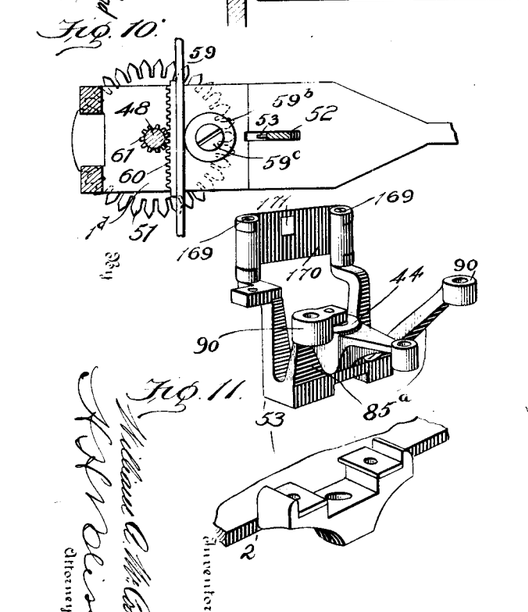
Fig. 10 is a plan of the carriage moving pinion and rack and the locking wheel.
Fig. 11 shows in perspective part of the main frame and also one of the brackets secured thereto.

The rack bar 59 is returned to its normal position after a key is released, thereby returning the type wheel to its normal position, by means of the guide arm 84 engaging with and bearing against one of the inclined faces 84$^a$. The upper edge of this bar 59 has a number of recesses 59$^a$ equaling the number of keys intended to operate therewith, and one vertical side of each recess coincides with, and rests immediately below, the thin edge of the cam block 108, on the key with which it coöperates. The recesses are practically rectangular in form, and each is of the width of its corresponding cam block and key lever. And all are of uniform depth, and, when any given key is depressed, the key lever and its cam block 108, fill their corresponding recess, and prevent end shake or lateral movement of the rack bar 59, its rack 60 and the type wheel 47 (which is pinioned thereto) during the latter portion of the stroke (Fig. 10). As all the cam blocks 108 have their greatest width at a point midway between the limits of their stroke, the type wheel is retained in its desired position while the continuation of the key stroke actuates other members, as hereinafter described.

Centrally attached to the lower edge of the differentially spaced and recessed setting bar 59 is a horizontal rack 60 extending below and projecting forward of the bar. Upon the front of the bridge 2 midway of its length is a bracket 53 (Fig. 3) which forms a bearing for a gear wheel 63 secured to a sleeve 49 and upon the lower end of the sleeve is secured a ratchet wheel 50 which is adapted to move the superposed carriage 3. This ratchet 50 is so correlated to the gear wheel 63 upon the sleeve 49 that its rotation of one tooth moves the superposed carriage one type space.

Extending through the sleeve 49 is a vertical shaft 48 on the upper end of which a type wheel 47 is fitted in such way that it is adapted to have a free vertical movement. Upon the shaft 48 a collar 109 is secured and an arm integral with said collar 109 is curved upward, as at 109$^a$, and enters a slot in the type wheel 47 and maintains it in fixed axial relation with the shaft 48 whether in its normal position or raised therefrom.

Between the cross brace 1$^b$ and a depending shelf 1$^d$ a pinion 61 is secured to the lower end of shaft 48 which pinion 61 meshes into the rack 60 upon bar 59 and the depression of any key causes the reciprocation of the differential setting bar 59 and the rotation of the type wheel 47 through the collar 109 and its arm 109$^a$ to bring the required letter into printing alinement with the paper on the carriage.

Figure 28:
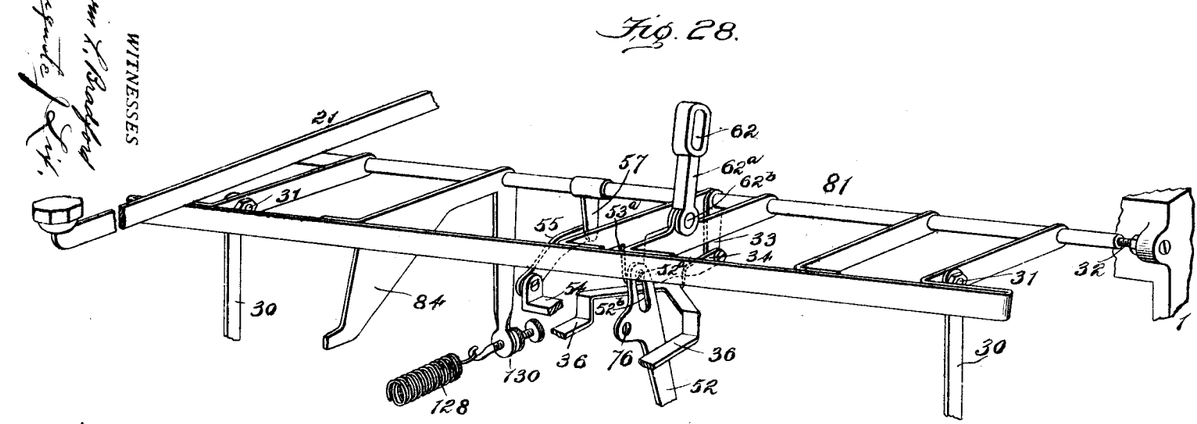
Fig. 28 is a perspective of the main rocking frame and showing some of the parts directly connected therewith.

Attached to the lugs 85 at the front of the bridge 2 by screws 66 is a key lever guide 75 slotted for the free admission of the key levers and to guide them in relation to the setting bar 59 (Figs. 2 and 3), and on the rear side of the brackets there is secured a similar slotted plate 58 in a vertical plane immediately behind that of the bar 59. On the rear part of the frame 1 and adjacent to the key seat 1$^c$ a rocking frame 81 is hinged transversely by means of pivots 32 (Figs. 8 and 28). This frame is normally supported in position by the spring 128 which is held by a hook 129 on the cross brace 1ᵇ and is adjustable as to tension by the screw hook 130 which connects the spring 128 to the rocking frame 81. The depression of any key depresses the rocking frame 81 to uniform distance.

Figures 19, 20:
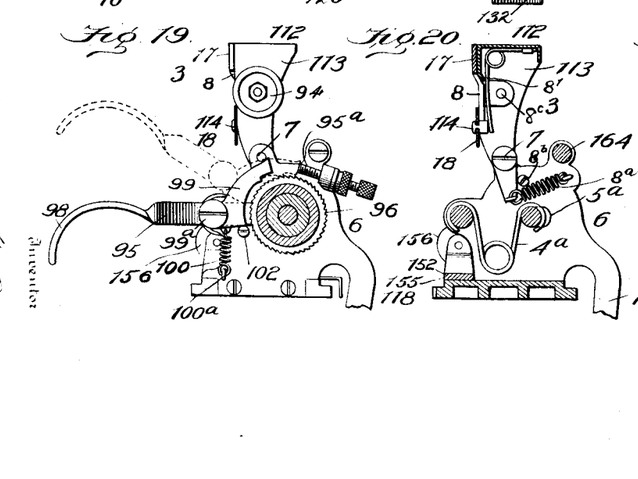
Fig. 19 is a vertical section on the line $z$—$z$ of Fig. 17.
Fig. 20 is a vertical section of the carriage on a vertical plane through the spindles of the rollers.

The carriage 3 is fitted to travel in or on the ways on the bridge 2. Its counter part ends 6, 6, are drilled and fitted alike for the journal of the rubber roll 4, the compression roll 5 in horizontal axial alinement therewith and to carry the paper frame pivoted at 7, 7, above the rolls (Figs. 3 and 20). Attached to the carriage 3 is a rack 64 meshing with the gear wheel 63 on the sleeve 49 (Figs. 3 and 25). In the rear of the rack 64 and below the rolls 4 and 5 is a curved deflector 101 which receives the paper that passes downward between the rolls and deflects it toward the rear of the machine. The paper support has two counterpart frame ends 113 carried by the pivots 7 secured to the carriage frame ends 6. These frame ends are connected by a top cross plate 112 parallel with the rollers 4 and 5. Journaled at 8ᶜ, in the frame ends 113, are two bars 8, 8, having at their upper ends a space indicating bar 17 and at their lower ends a cushion band 18 of rubber or other elastic material or fabric adapted to form a shield between the hammer 15 and the paper, and held by studs 114. Knobs 94 (Fig. 17) at the pivots of bars 8 outside the frame ends 113 permit the rotation of space bar 17 and band 18 so that the paper can be passed down beyond the space bar and in front of the band and then directly to the space between the rolls 4 and 5. Thence it is deflected by the curved deflector 101 toward the rear of the carriage 3. A slot 5ᵃ permits the roll 4 to play bodily toward or from the roll 5 and to receive two or more sheets of paper, while spring 4ᵃ preserves the contact between the rolls and the paper (Fig. 20). At the right-hand end of the carriage 3 the journal of the roll 4 is extended and has loosely fitted thereon the lever 95 (Figs. 2 and 19), and beyond the lever it has a knob 97 carrying at its inner end a ratchet 96. With the ratchet a pawl 99 is adapted to engage, this pawl being pivoted at 99ⁿ to the lever 95.

100 is a spring connected to the lower edge of the pawl and at 100ᵃ connected to a stationary frame piece.

102 is a pin in the frame piece adapted to be struck by the lower edge of the pawl 99 as the latter descends to cause the point of the pawl to be lifted away from the ratchet wheel 96. Therefore, normally, the pawl is disengaged and the ratchet wheel and the roll are free and can be turned by hand in either direction through the medium of the knobs 9⁷ 97. The throw of the lever 95 and the pawl 99 can be varied or regulated so as to advance more or less paper at each throw, by means of the adjustable stop screw 95ᵃ mounted in an ear on the frame piece and provided with a lock nut.

98 is a hook handle at the end of the lever 95 and adapted to be so arranged that it can be quickly grasped by the fingers of the operator.

The carriage in the present mechanism is advanced by a spring controlled by a step by step regulator of a pawl and ratchet character, the latter being brought into action at each movement of the key levers.

157 is a cord drum or sheave whose hub 163 is rigidly secured to the sleeve 49 which carries the carriage engaging pinion 63 (Figs. 2 and 4).

158 is a cord adapted to be wound upon and to unwind from the drum or sheave 157 and also to be wound upon and let out from a drum or sheave 159 mounted in the frame in the lower part of the machine at the rear. This drum 159 is connected with a coiled spring 160, the latter having in turn one end connection to a stationary object which can be adjusted at will to regulate the tension of the spring. As shown, the spring is attached to the axial sleeve of a shell or cylinder 161 with milled flange 162. Normally the spring is so adjusted as that it shall exert at all times tension upon the cord 158 and through that and the drum or sheave 157 and the parts at 49, 63 and 64 exert draft upon the carriage in the direction of the left side of the machine. And, vice versa, the drawing of the carriage toward the right acts, through the rack and pinion at 64, 63 and through the cord drums 157, 159 to again wind the spring or restore its tension to the predetermined degree.

The stress of the spring and connecting parts is controlled as follows: 50 is a ratchet wheel rigidly secured to the sleeve 49 in a plane just below the drum or sheave 157 (Figs. 3, 4 and 26). With it is combined an escapement mechanism having the following parts. 54 is a horizontally arranged lever pivoted to the frame at 57ᵃ and having an arm 56 adapted to move into the path of the ratchet teeth and engage them successively. 135 indicates, as a whole, the other element of the escapement, having an arm 137 pivoted at 57ᵉ and an arm 136 connected to the lever 54 by means of a pin 139 fitted in a slot 138. This arm 136 extends beyond the lever 54 a short distance, as shown at 140. The wheel engaging part of this element is indicated by 141 it being an L-shaped detent pivoted to the part 135 at 141ᵃ and having a nose at 145 adapted to be moved into and out from the circular path of the ratchet teeth. It is capable of two movements, one in company with the part 135 around the pivot at 57ᵃ, and the other independent of 135 the part 135 around the pivot at 141ª. A spring 143 tends to cause the rear arm 142 to move toward the stop 143ª. 144 is a spring arranged to bear against the part 135 and hold it in the extreme position permitted by the pin 139 and slot 138.

The devices just described receive intermittent movements through the link 55 pivoted to the lever 54 and also pivoted to a crank arm 57 carried by the axial part of the rocking frame 81. And it will be seen that at each downward motion of this rocking frame (caused by a downward movement of a key lever) the parts at 57, 55, will draw backward on the end of lever 54 and bring the nose or point 146 immediately in front of a ratchet tooth on the wheel 50 and at about the same instant will draw the detent 141 away from its ratchet tooth on the opposite side of the wheel. After this occurs the wheel would be rotated under the stress from the spring 160 transmitted through the parts connecting it to the carriage but for the stopping effected by the point 146 of the arm 56. As soon as a key lever is released the spring 128 acts to restore the rocking frame 81 to swing the lever 54 so that its nose at 146 will escape from the ratchet wheel and at the same time bring the detent 141 inward toward the center of the ratchet. While the detent 141 is disengaged from the ratchet the spring 143 rocks it around the pivot at 141ª throwing the nose or point part 145 relatively backward somewhat on the circle; and consequently this point part cannot get in front of the immediately adjacent ratchet tooth but the beveled or inclined end edge of this point 145 bears against the inclined edge of the ratchet tooth and the latter is free to move as soon as the nose 146 on the opposite element of the escapement leaves its ratchet tooth; and the wheel 50 will advance one step and the carriage will move forward a corresponding distance. In connection with this part of the machine it is to be noted that I provide for disengaging the ratchet wheel entirely from the escapement so that the carriage can be freely moved in either direction. The operator effects this disengaging of the escapement with his hand at will.

147 is a link or thrust rod connected by a pivot at 148 to the arm 140 of the escapement element 135. If the arm 147 be pushed backward it will compel the part 135 to swing around the pivot 57ª a short distance because of the slot 138 in which the pin 139 is fitted; and in so moving backward the detent 141 is withdrawn from the ratchet teeth of wheel 50; and at the same time the arm 56 with its nose or point 146 of the other element of the escapement will still remain out of engagement with the ratchet. To move the link rod 147 backward use is made of a lever 149 pivoted at 150 to the plate 58 (Figs. 4 and 25). The upper end of the lever 149 is bent backward as shown at 151 so as to lie over the teeth of the rack 64 on the carriage plate.

152 is a movable sliding plate mounted on the bottom of the carriage. It is held in position by means of pins or screws 154 which fit in an inclined slot 153. When it is pushed longitudinally it moves also laterally. In the path of its edge 155 during lateral movement the aforesaid end 151 of lever 149 lies; and consequently when the plate 152 is pushed endwise, its resulting lateral movement causes the lever 149 to swing forward at its upper end and backward at its lower end and this backward movement of the latter releases the detent 141 from the ratchet wheel. 156 indicates a knob or thumb button secured to the plate 152 and projecting laterally from the left hand end of the carriage in such way as to be readily accessible for the operator's fingers. When he desires to move the carriage freely backward or forward without interference from the ratchet mechanism, he presses a finger against the knob 156 endwise of the plate 152 which results through the parts at 151, 149, 147, 148, 135 in disengaging the detent 141.

By so disposing the plate 152 that it must be pushed toward the right to release the escapement, I so arrange the parts that the force that is exerted by the operator's hand to do this is in opposition to the spring 160 and the power of the latter is practically nullified or balanced. Consequently there is no danger of sudden movement of the carriage toward the left. Such movements are prevented by the pressure from the operator's hand, and if his hand or finger should slip, or be suddenly drawn away, the lever 149 is as suddenly relieved of pressure from the plate 152 and the detent 141 instantly restored to the position for engagement with the ratchet teeth, by the spring 144 for it is in opposition to this spring that the plate 152, the lever 149 and link 147 work.

Figure 9:
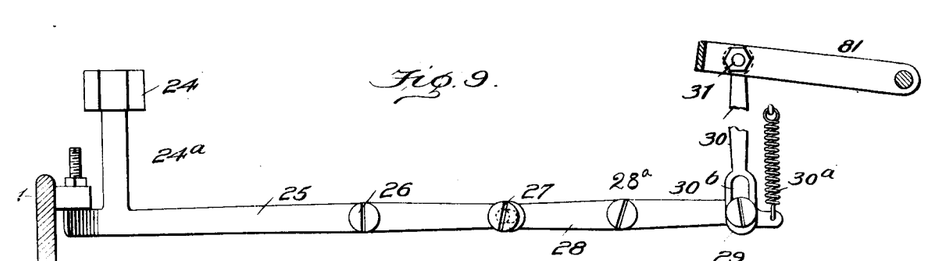
Fig. 9 is a view of one pair of the levers detached by which the carriage is moved without printing.

To accomplish the spacing of the characters printed on the paper, or, in other words, to accomplish the shifting of the carriage any desired distance without producing printed characters and without the depression of any of the character keys, the spacing bar 24 is used (Fig. 9). It lies near the front edge of the machine and in a relatively low plane. It is attached to two levers 25, 25, mounted on horizontal pivots 26. Preferably these levers 25, 25, are formed in one piece with the standards 24ª and cross connecting bar 24ᵇ. At their rear ends the lever arms 25 are, as at 27, pivotally connected to supplemental levers 28 which are in turn pivoted at 28ª to the side parts of the machine. These levers 28 at their rear ends are connected to upwardly extending links 30, the connection being effected by means of pins or screws 29 fitting in slots 30ᵇ. The links 30 are pivotally connected at 31 to the vertical rocking frame 81. A spring 30ᵃ is employed, one end connected to the rear end of the lever 28 and the other connected to the frame.

When downward pressure is exerted on the spacing bar 24 and downward swing is imparted to the frame 81 a movement of the parts of the escapement is caused such as above described, that is to say, they are moved in such way as to permit the ratchet wheel to advance one step under the force of the spring 160 with a consequent advance of the carriage one step. A repetition of the depressing of the spacing bar 24 gives additional steps of advance of the carriage and a blank space, of such length as is desired on the paper, can be secured.

In order to hold the type wheel 47 firmly and accurately in position after it has been set by the depression of the key, the following devices are used. The shaft 48 upon which the type wheel is mounted extends below its driving pinion 61 and upon its lower end there is secured a wheel or notched disk 51, the periphery of which has as many recesses or notches as there are vertical rows of characters on the type wheel. 52 is a lever pivoted at 76 in a support on the frame and extending downward, it being arranged in such way that its end at 53 can engage with one or another of the notches or recesses in the wheel 51, this end 53 being beveled or knife-edged to insure accuracy. It is actuated by an arm 53ᵃ carried by the rocking frame 81 this arm having a pin or screw 52ᵃ fitted in a slot 52ᵇ in the lever 52. The slot permits this, namely, that the frame 81 will move downward some distance before the lever 52 starts to move. During this preliminary interval the type-setting agencies bring the type wheel to the desired position and after that occurs the pin 52ᵃ bears against the lever 52 and forces the sharp edge at 53 into a notch on the wheel 51 with the result that the type wheel is properly alined and is held in alinement until the printing operation is completed.

The printing act is effected by the blow of a hammer constructed, arranged, supported and actuated as follows: 118, 118, are arms extending downward from the end plates of the carriage 6. 10 is a rod extending across the carriage and pivotally mounted in these arms 118. To this rod 10 there are secured angle arms 9, one at each end of the carriage. These are connected at their upper ends by a rod 12 and the inwardly turned parts of the arms 9—9 at the bottom are connected by the rod 11, the rods 10, 11 and 12 being substantially parallel, the whole forming a frame pivoted upon the axis of the rod 10 in the carriage ends.

Figures 17, 18:
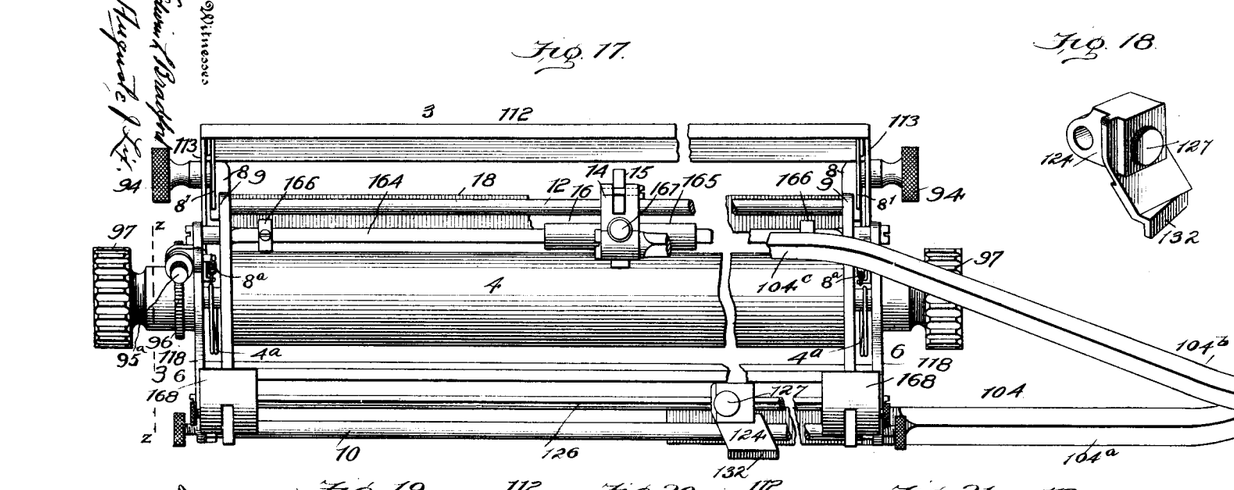
Fig. 17 is a rear view of the carriage and showing also the hammer supporting bar.
Fig. 18 is a perspective of the alarm tripper.

15 is a hammer mounted on substantially horizontal lines and in a central, vertical plane of the type wheel, longitudinally of the machine. It receives its motion from the frame last described, the rod 12 engaging with it. The hammer is carried upon a support consisting of a curved bar 104 and a frame supported thereby (Fig. 17). The supporting bar 104 has a bottom horizontal part 104ᵃ, a backward curved and inclined part 104ᵇ and an upper horizontal part 104ᶜ. The horizontal part 104ᵃ fits in a guideway immediately under the bridge plate of the frame immediately below the bottom of the carriage, there being lugs at 105 which provide the guides for it. It can be pushed into an inactive position when it is desired to store the machine in small compass. But when the machine is to be put to use it can be drawn out to its working position. In the latter it is locked by a pin 107 fitting an aperture 107ᵃ in the bar 104.

106 is a lever at the left side of the machine, this lever engaging with the lock pin 107 (Fig. 4). 106ᵃ is a spring so correlated with the pin 107 as to normally cause it to press inward. By the lever 106 the pin can be drawn outward against the pressure of the spring. When the pin is in the aperture 107ᵃ the hammer support 104 is held firmly in place.

The upper part 104ᶜ of the hammer support is attached to a frame indicated by 16. This frame includes an elongated tube 165 at its front end which is fitted to a bar 164 mounted in the carriage frame and secured to the ends 6 thereof, and also includes upwardly rising guide lugs 14. The hammer bar 15 slides forward and backward in the guideway provided on this frame. The length of its throw can be adjusted by means of the stop screw 167, lying in the path of the lug 15ᵃ, on the hammer.

Figure 1:
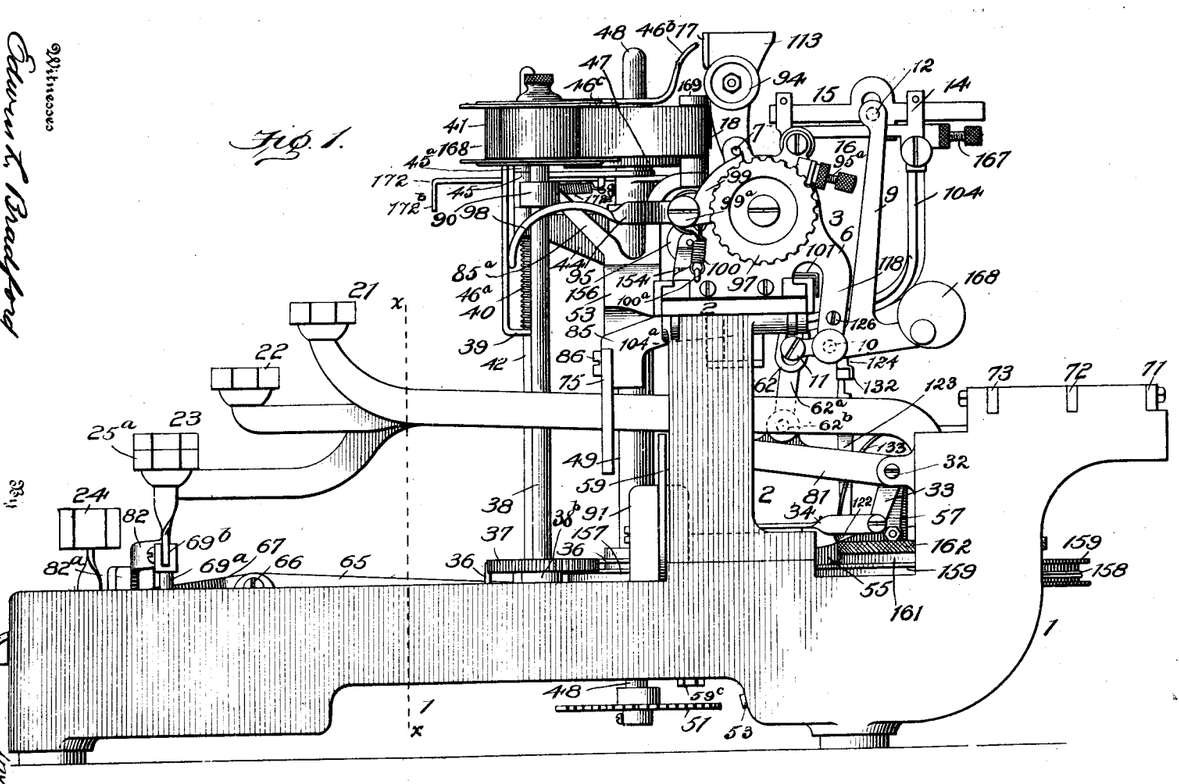
Figure 1 is a side elevation of a typewriting mechanism embodying my invention.

Motion is imparted to the hammer frame by a slotted loop 62 encircling the bar 11 and carried by a link 62ᵃ which is pivoted at 62ᵇ to the rocking frame 81 (Figs. 1, 3 and 28). The slot in the loop 62 is of such length that the bar 11 is engaged after the wheel 51 has been locked and which is before the end of the downward movement of the key bar. This loop and link cause the hammer frame to rock on its journals on the axle of the bar 10 and cause the hammer 15 to move toward the type on the wheel 47, it first striking the band 18 in the rear of the paper and impressing the paper upon the inked ribbon 41 which is interposed between the band and the type wheel.

In front of the carriage and supported upon the bridge part of the main frame, there is a bracket 53 which carries or has formed with it the bracket 44 and the two arms 85ᵃ, which extend forward and provide bearings 90 in which are mounted respectively the vertical shafts 38, 38, for the ribbon spools. These spools 168 are mounted upon the upper ends of the shafts 38, one spool being on each side of the central vertical longitudinal plane. These shafts at their lower ends are mounted in the bearings at 38ª in the frame having collars 38ᵇ above the bearings. They are impeded in their rotation by spring holders as at 87. These preferably are flat metal springs secured to the main frame and bearing downward against collars 38ᶜ secured to the ends of the shafts. Each shaft has a ratchet wheel 37.

36, 36, indicate the two toothed bars of the bifurcated pawl arranged in the horizontal plane of the ratchet wheels 37. The stem or connecting bar 34 of these pawl arms extends backward and is pivotally connected to the crank arm 33 on the rocking frame 81. The front ends of the bars 36 are turned down and are connected by a cross bar or plate 36ᵇ resting upon the bottom frame bar 1ª. It is slotted at 36ᶜ and in the slots are fitted screws 36ᵈ fastened in the frame plate. This bifurcated pawl device receives longitudinal movement forward and back at each rise and fall of the main swinging frame 81; and one or the other of the ratchet wheels 37 will receive a step of movement at each reciprocation, the other ratchet wheel being free at such time (except for the impeding caused by the friction causing spring holder 87) to rotate in the opposite direction. The bifurcated pawl, as a whole, can be shifted laterally from one wheel 37 to the other by means of a knob or handle at 79 on the lever 79ª pivoted at 79ᵇ (Fig. 7). At the inner end of this lever there is a fork having the arms 103 between which lies a downwardly extending pin 35 projecting from the center of the bar 36ᵇ. These arms 103 are preferably elastic or flat spring bars. If the knob 79 be moved in one direction it will, through the parts just described, cause the bifurcated pawl device 36 to move in a corresponding direction toward one of the ratchet wheels 37, and the spring arms at 103 will act to hold it so that its tooth 36ª will be in position to engage the teeth upon said ratchet. When the ribbon has been carried from one roller 168 to the other, the operator throws the knob 79 to its other position which in turn shifts the pawl device 36 over to the other wheel 37, and thereafter the movement of the ribbon will be reversed, that is, will be wound, step by step, upon the empty spool and drawn from the one which has been filled.

Figures 12, 13, 14, 15, 16:
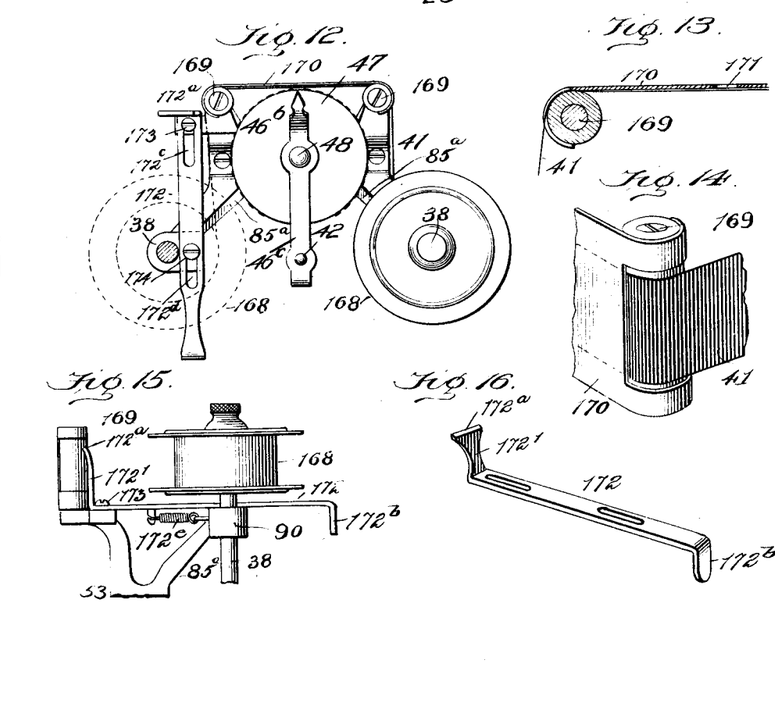
Fig. 12 is a detached view showing in plan the type wheel and the ribbon rollers, one of the latter being dotted.
Fig. 13 is a section on a larger scale of part of the ribbon guide devices.
Fig. 14 is a perspective of the parts in Fig. 13.
Fig. 15 is a side view of the gaging device for ascertaining the printing line.
Fig. 16 is a perspective of the gage in Fig. 15, detached.

From the bracket 53 rise two vertical arms 169 (Fig. 11). To them is secured the ribbon guide 170, it being formed of thin sheet metal which is bent at the ends to form tubular attaching devices to engage with the arms 169. It has an aperture 171 through which the type can effect the printing when the hammer strikes its blow. The ribbon 41 passes around the arms 169 and immediately behind and in contact with this guide plate 170 when it is traveling from one spool to the other (Fig. 14).

It will be seen that the shaft 48 above referred to and the shaft 42 have bearings in this bracket part 53 (Fig. 3). The shaft 42 has a collar 45 rigidly secured to it, this having an arm which extends backward or inward on lines immediately below the type wheel 47. Near its upper end it has another collar or perforated arm 46 and between the latter and the collar 45 there is a tube or thimble 45ª. Preferably the collar or perforated plate at 46 is formed in a bar which is carried down, as shown at 46ª, to a collar or perforated plate 39 some distance below the stationary bearing 44.

40 is a coiled spring around the shaft 42 between the bearing 44 and the collar or plate 39. It will be seen that if the shaft be pushed upward the collar 45 rigidly secured thereto, will also rise and the sleeve at 45ª, and the bent and perforated bar 46ª, 39, will be caused to rise and that the type wheel will be carried upward. As soon as the lifting force is stopped, the spring 40 will restore the aforesaid parts to their normal positions. The bent and perforated bar referred to is preferably extended inward and backward, as shown at 46ᶜ and is again perforated so that the shaft 48 can pass through it, and is finally bent upward, as at 46ᵇ to form an index or pointer which can be used in connection with the graduated gage to indicate the relative position of the carriage and the type.

The upward lifting of the shaft 42 is made possible in order to bring one horizontal plane or another of the type wheel 47 into alinement with the path of the hammer 15, this type wheel being provided with parallel circular series of characters, the said several series lying in different horizontal planes respectively.

Figure 5:
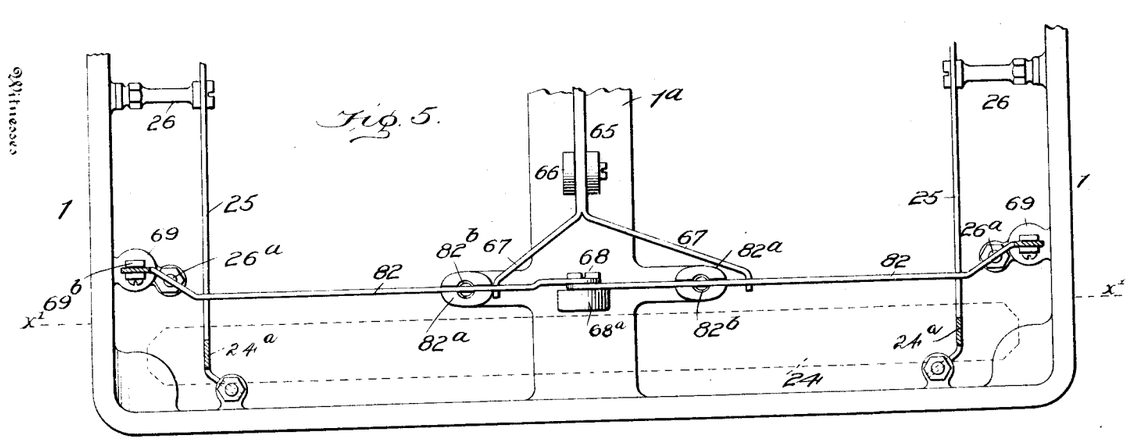
Fig. 5 is a plan view of the front part of the main frame and showing partly in plan and partly in section the levers by which the type wheel is shifted.
Figure 29:
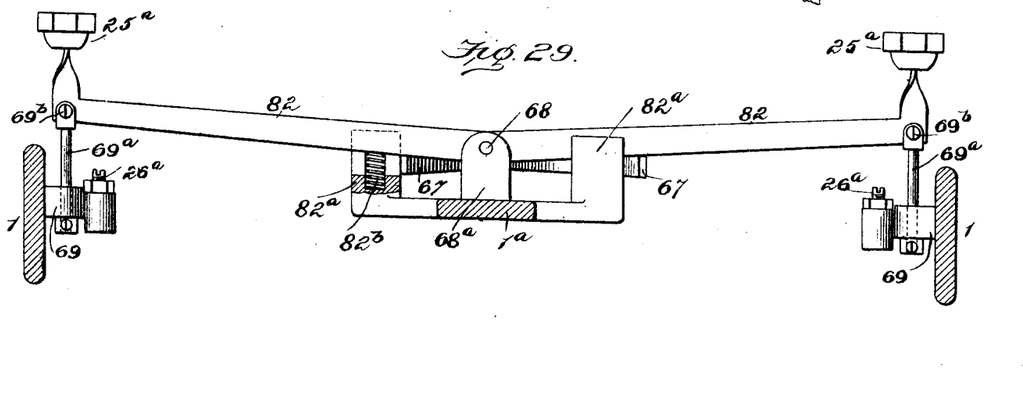
Fig. 29 is a section on the line $x'$—$x'$ of Fig. 5.

The lifting of the shaft 42 is accomplished by means of keys at 25ª, these being the extreme right and the extreme left keys in the front row (Figs. 5 and 29). Each of these keys is connected to a lever 82 arranged on lines transverse of the machine and both held by a common pivot at 68 to a stud 68ª on the frame. Their inner ends are guided by means of slots in posts 82ª and they are returned quickly to normal position by means of the springs 82ᵇ (Fig. 29) seated in these posts.

65 is a lever arranged longitudinally of the machine and pivoted in a post or bracket at 66 (Figs. 3 and 5). It has at its outer end a fork, the legs of the fork being indicated by 67. These legs respectively lie under and are engaged by the aforesaid levers 82 when the latter move downward. One of the legs (as shown, the one on the right hand) 67 contacts with its lever 82 at a point much farther from its common pivot than does the other (the one on the left as indicated) and consequently when the right-hand key 25ª is depressed it will swing the inner end of the lever 65 upward to a greater distance than it will swing when the left-hand key 25ª is depressed. The lever 65 engages with the shaft 42 by means of a clutch at 43 which may consist of collars secured to the shaft, one above and one below the fork-end of the lever.

By means of the train of devices just described, it will be seen that the type wheel 47 can be put into either of three positions, the first being its normal position, the second being that to which it is raised by depressing the left-hand key 25ª, and the third that to which it is raised by depressing the right-hand key 25ª. The type wheel can be provided with a series of lower case characters, a series of upper case characters and a series of numerals, and any one of these series can be brought into action at pleasure.

In order to insure that the movements of the type wheel shall be limited with accuracy, I employ adjustable stops 26ª, these as shown being screws inserted into holders in the frame and capable of having their ends moved up or down to increase or decrease the movement of the levers 82 (Fig. 29). To guide the keys 25ª and the levers 82 with accuracy during their movements, I employ vertically sliding guide rods 69ª which are pivoted at 69ᵇ to the ends of the levers, these guide rods moving in guideways or sockets at 69 in the main frame.

121 indicates a gong or bell which is secured to the rear cross bar of the main frame and 122 is a hammer adapted to strike it (Fig. 2). This hammer is carried by a swinging arm 123 pivoted to a support in the frame. The upper end of the arm 123 lies in the path of a trip device 124 secured to a rod 126 fastened to the carriage. The trip device can be adjusted to any desired point along the rod 126 by the set screw 127 (Figs. 3 and 18). At the lower part of the trip there is an inclined bar 132 arranged so that its vertical edges are inclined to the path of the carriage (Fig. 17). As the carriage approaches the predetermined limit of its travel this cam bar 132 engages with the upper end of the hammer arm 123 and causes it to move forward against the tension of the spring 133. And at the instant of its escape therefrom the spring throws the hammer against the gong 121 and notice is given that the said limit of movement has been reached.

172 indicates a device for indicating the printing line of the type wheel and enabling the operator to quickly adjust the sheet of paper within the machine so as to print a row of characters on any desired line on the paper (Fig. 15). This device comprises a bar of metal bent upwardly at its rear end as indicated at 172' (Fig. 16), and having its upper edge sharpened as indicated at 172ª, the front end of the said bar being bent downward as indicated at 172ᵇ to form a handle for adjusting the device. This bar is slotted as indicated at 172ᶜ and 172ᵈ and is mounted upon the bracket 53 immediately beneath the left hand ribbon drum 158.

173 and 174 are screws having their shanks extending through the slots 172ᶜ and 172ᵈ respectively, fitted into the bracket 53 and adapted to hold the bar 172 in position and guide its forward and backward movements.

172ᵉ is a spring having one end secured to a lug or projection on the bar 172 and its other end secured to the bracket 53, its purpose being to normally hold the alining device in its forward position. The operation of this device will be readily understood, the operator simply pressing forward on the handle part 172ᵇ, causing the sharpened edge 172ª to approach the paper and indicate the line upon which the character will be printed.

In order to insure that the rack 60 on the setting bar 59 will always be held in proper relation to the pinion 61 I have provided a guide roller 59ᵇ arranged to bear against the rear wall of the said bar 59 and pivotally mounted upon a stud 59ᶜ having its axis in the same vertical longitudinal plane of the machine with the axis of the shaft 48.

Figure 21:
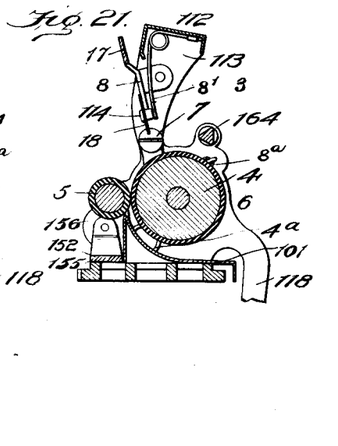
Fig. 21 is a vertical section of the carriage and of the rollers.

In Figs. 20 and 21 I have shown springs 8' each having one end secured to the plate 112 of the paper frame, and their other ends bearing against the lower ends of the adjacent swinging bars 8 and adapted to normally hold the said bars so that the bar 17 will clamp the paper between it and the adjacent wall of the paper frame. 8ª are springs secured at one end to the lower end of the adjacent plate 113 of the paper frame, and at their other ends to the adjacent end wall of the carriage and adapted to hold the said paper frame yieldingly in position against the stop screws 8ᵇ fitted into the said side plates 6. This arrangement of parts permits the yielding of the paper frame relatively to the type wheel.

As shown in Fig. 22 the under edges of the cams 108 on the key levers which engage with the walls of the slots in bar 59 are concaved as indicated at 108', and these concaved surfaces are so arranged with respect to the actuating bar which they engage and with respect to the movement of the key levers that, when a key lever is depressed, the part of the concave surface which engages the actuating bar during the first part of the depression is approximately parallel to the movement of the key lever. By reason of this the actuating bar is accelerated gradually and there is no sudden shock when a key lever is struck, but on the contrary, the "touch" is soft and even.

While in the drawings I have shown a spring motor for effecting the movement of the carriage when the escapement mechanism is properly operated, it will be understood that any other well known type of motor may be employed without departing from the spirit of my invention.

What I claim is:—

1. In a typewriter, the combination of the frame, the paper carriage, the type wheel, the devices which rotate and set the type wheel, the swinging frame, the carriage motor, the power transmitting devices interposed between said motor and said carriage, the escapement mechanism for controlling the operation of said power transmitting devices actuated by said swinging frame, a printing hammer actuated by said swinging frames, type wheel returning devices actuated by said swinging frame, and a series of key levers each adapted to actuate the wheel setting devices and the said swinging frame independently of each other.

2. In a typewriter, the combination of the frame, the paper carriage, the type wheel, the longitudinally sliding bar for turning and setting the type wheel, the swinging frame, a series of key levers each adapted to directly actuate the said sliding bar and the said swinging frame, a printing hammer, a type wheel returning mechanism, a type wheel locking mechanism, all actuated by said swinging frame, a carriage motor, power transmitting mechanism interposed between said motor and said carriage, and an escapement mechanism for controlling the operation of said power transmitting mechanism actuated by the said swinging frame.

3. In a typewriter, the combination of the frame, the paper carriage, the type wheel, the support for the inking ribbon, means for positively moving the carriage, escapement mechanism for controlling the operation of said carriage moving means, means for positively moving the ribbon, means for setting the type wheel, means for locking the type wheel, a hammer, a movable bar actuated by the key levers and transmitting motion to the type wheel setting devices, a swinging frame actuated by said key levers and transmitting motion to the wheel restoring devices, to the said escapement mechanism, to the hammer, to the ribbon moving mechanism and to the type wheel locking mechanism.

4. In a typewriter, the combination of the frame, the carriage movable on the frame, the type-wheel, means for positioning the type-wheel, the printing hammer mounted to coöperate with the type-wheel, a swinging frame, key levers adapted to operate the wheel positioning means and said swinging frame, means in operative engagement with the swinging frame for locking the wheel and lost motion connection between the swinging frame and printing hammer.

5. In a typewriter, the combination of the frame, the paper carriage, means for controlling the movement of said carriage, the type wheel, the printing hammer, the series of key-levers mounted on the frame, a guide plate slotted to receive the key levers, means for positioning the type wheel arranged to engage the key levers adjacent said guide plate, and a swinging frame for actuating the printing hammer and the carriage controlling means, said swinging frame having a transverse part disposed adjacent said guide plate in position to be engaged and actuated by the key levers.

6. In a typewriter, the combination of the frame, the paper carriage, the motor for moving said carriage, controlling means for said motor, the type wheel, the printing hammer, the series of key levers mounted on the frame, a guide plate slotted to receive the key levers, means for moving the type wheel to printing position arranged to engage the key levers adjacent the said guide plate, the type wheel returning devices, and a swinging frame for actuating the printing hammer, the said motor controlling means and the wheel returning means, said swinging frame having a transverse part disposed adjacent said guide plate in position to be engaged and actuated by the key-levers.

7. In a typewriter, the combination of a frame, a type wheel actuating bar having a series of contact surfaces, a type wheel, driving connections between the actuating bar and the type wheel, and a series of key levers having concave cam surfaces on their under sides to co-act with the contact surfaces of said bar, said concave surfaces being so formed that the parts of the concave surfaces which engage the actuating bar during the first part of the depression of the key levers are approximately parallel to the movements of said levers respectively 8. In a typewriter, the combination of a frame, a type wheel, a series of key levers mounted on the frame, and a type wheel actuating bar disposed below and transverse to the said key levers and having its upper edge formed with slots for the entrance of the keys, said key levers having concave cam surfaces on their under sides to co-act with the sides of the said slots, said concave surfaces being so formed that the parts of the concave surfaces which engage the actuating bar during the first part of the depression of the key levers are approximately parallel to the movements of said levers respectively.

9. In a typewriter, the combination of a frame, the type wheel having three peripheral series of characters, a vertical shaft supporting said type wheel and adapted to move vertically, a clutch element on the vertical shaft, a clutch lever pivoted on the machine having one end engaging the said clutch element and its other end forked, the free ends of the legs of said fork being at different distances from the longitudinal axis of said lever, and two key levers pivoted on a common axis in the vertical plane of the longitudinal axis of said lever and each adapted to engage the free end of one of said fork legs.

10. In a typewriter, the combination with the frame, the carriage movable transversely of the frame, and the type wheel mounted on the frame, of a device for indicating the horizontal printing line when the carriage is in normal printing position, said device being mounted on said frame and movable forward and back relative to the carriage into and out of operative position.

11. In a typewriter, the combination of a frame, the type-wheel having three peripheral series of characters, a vertical shaft supporting said type-wheel and adapted to move vertically, a clutch element on the vertical shaft, a clutch lever pivoted on the machine having one end engaging the said clutch element and its other end forked, and two key levers each arranged to engage one of the legs of the forked end of the clutch lever and give to said lever a different extent of movement than is given it by the other key lever.

In testimony whereof I affix my signature, in presence of two witnesses.

WILLIAM A. McCOOL.

Witnesses:
 HERBERT C. EMERY,
 AUGUSTE J. LIX.

Copies of this patent may be obtained for five cents each, by addressing the "Commissioner of Patents, Washington, D. C."